May 16, 1961   J. ŠIMEK   2,984,110
OPTICAL VIBROMETER

Filed Feb. 2, 1956   4 Sheets-Sheet 1

INVENTOR.
Jiří Šimek
BY Richard ——
Ag't

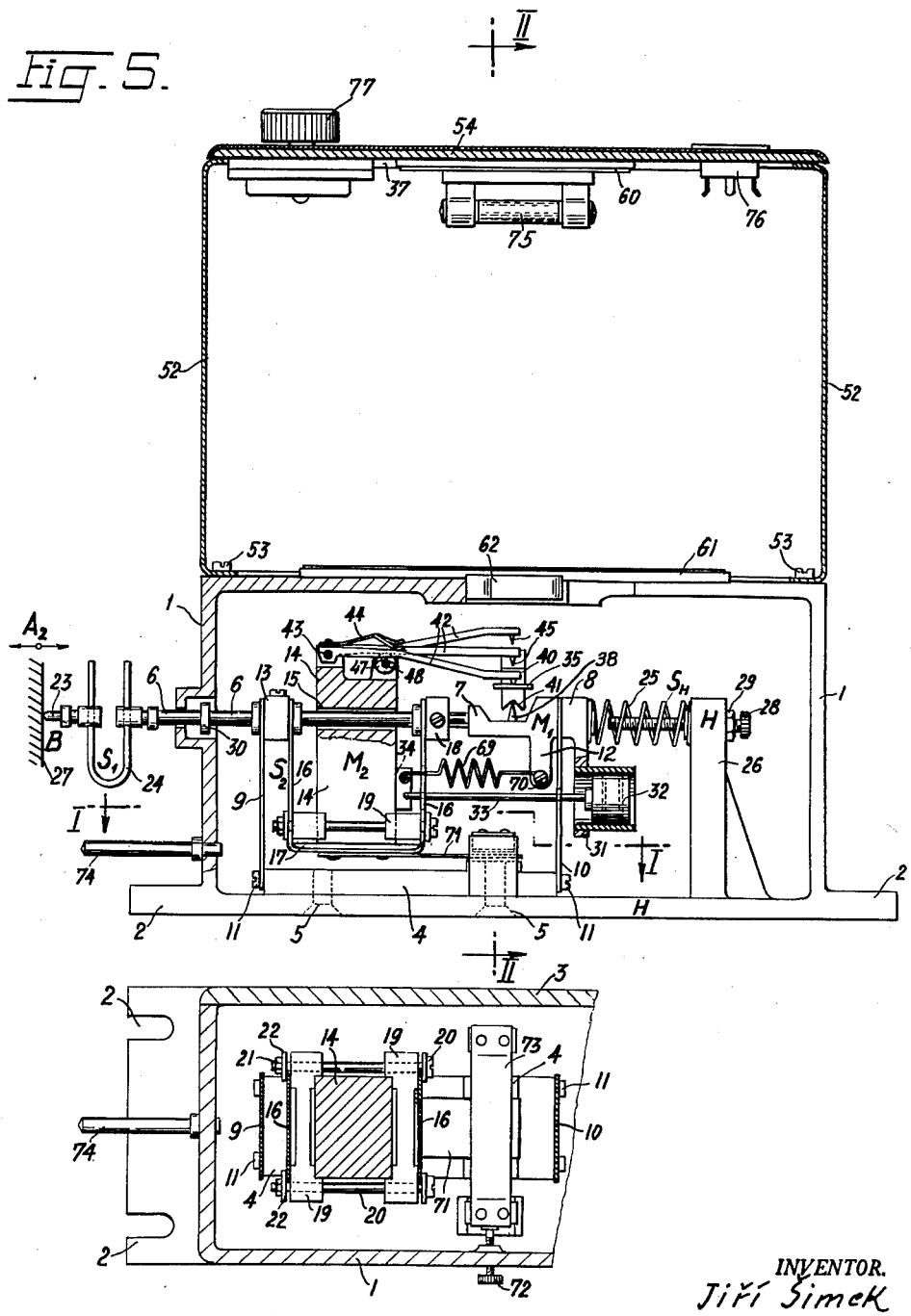

INVENTOR.
Jiří Šimek

INVENTOR.
Jiří Šimek
BY Richard Ernst
Ag't

United States Patent Office 2,984,110
Patented May 16, 1961

2,984,110
OPTICAL VIBROMETER
Jiří Šimek, Krymska 4, Praha, Czechoslovakia
Filed Feb. 2, 1956, Ser. No. 563,176
Claims priority, application Czechoslovakia Feb. 12, 1955
12 Claims. (Cl. 73—464)

The present invention relates to optical indicators and its object is to provide an improved and universal instrument for measuring the amplitudes of mechanical vibrations in or of bodies. The instrument is particularly adapted for measuring time or phase relations between the measured vibrations and some other cyclic phenomena and is thus suitable for checking the vibrations of different kinds of engines, machines, their foundations and the like. The instrument is also particularly useful for the dynamic balancing of rotating machine elements in the laboratory as well as in the workshop. The instrument can also be used for measuring small displacements.

The main object of the invention is to provide a simple, robust, portable and accurate vibration indicator that can readily be converted from a relative or absolute instrument into a "two-mass" system, by which, after adequate setting of the natural vibrations of its two masses, elimination of periodic disturbing movements can be obtained. Such disturbing movements are usually superimposed onto vibrations produced, for example, by out of balance forces, and make the accurate measurements of vibration amplitude and phase by similar known devices quite difficult. With the "two-mass" system of a vibration indicator embodying this invention, the measurable frequencies lie approximately in the range between the frequencies of the respective natural vibrations of the two masses of the system.

A further object of the invention is to provide an improved optical vibration meter which not only permits vibrations of different frequencies to be studied as to their amplitude and phase, but also has means to magnify the displacements of vibrations to a required degree, so that a single instrument is usable for a whole range of differing magnitudes of oscillations.

A still further object of the invention is to provide such an arrangement of the contactor, that is, the means for introducing into the instrument some other cyclic phenomenon, for example, the rotation of a machine part producing the vibrations to be studied, rendering the device sensitive to a high degree of phase measurement.

The above, and other objects, features and advantages of the invention, will appear from the following description.

To explain more clearly the principle of the invention, attention is drawn to the accompanying drawings, wherein:

Fig. 5 is an elevational view, partly in section, of an optical vibration meter embodying the present invention;

Fig. 6 is a plan view, partly in horizontal section, of a part of the vibration meter, and taken along the line I—I of Fig. 5;

The measurement of vibrations can be effected with instruments working on one or the other of the following systems:

(a) The relative system which is characterized by the absence of any yielding mass. The movement of the vibrating body is considered in relation to another fixed body. Such an arrangement of the vibration indicator indicates all vibrations equally, irrespective of their frequencies.

Figure 1:
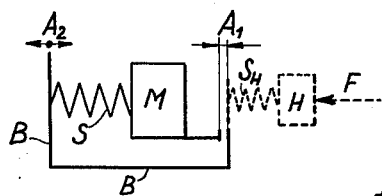
Fig. 1 shows, in diagrammatic form, the function and principle of the hitherto well-known absolute, or one-mass system.

(b) The absolute, seismic or one-mass mechanical system for a vibration indicator is diagrammatically illustrated in Fig. 1. It consists of a base, or casing B that is to be rigidly connected to the vibrating body, for example, by a feeler, supporting legs and the like, so that it forms dynamically only one integral part. To this dynamic mass B, a so-called seismic mass M is yieldingly attached. That attachment is shown in form of a spring S in Fig. 1. It is obvious that the frequency of natural vibrations $f_M$ of the seismic mass M influences the measurement by such a system, vibrations of a frequency lower than $f_M$ are suppressed by this arrangement. It is to be understood that in some cases the instrument could be arranged in a different manner, for example, so that the casing performs the function of the mass M, while the vibrations of the body are taken up by a feeler or transmitting rod, or by both a feeler and transmitting rod, complementing the dynamic mass B, but the diagrammatic lay-out according to Fig. 1 remains the same.

This arrangement is useful especially in those cases where great accelerations of the vibrating body occur and the handling force, that is, the force pressing the instrument against the body, usually applied by hand, can be diminished by making the dynamic mass as small as possible.

To make the manipulation still easier, in some known instruments a so-called elastic handle H with spring $S_H$ can be used by means of which the instrument is pressed with a force F against the vibrating body. These elements are shown in dotted lines in the dynamic diagram of Fig. 1. It must be noted that neither the mass H nor the spring $S_H$ have any influence on the vibrational or dynamic character of the instrument, their only object is to prevent the great part of accelerations of the vibrating body reaching the hands of the operator.

But in all these cases there is only one yielding mass M that can be made to swing, and thus one can speak in this instance of a one-mass system.

Figure 2:
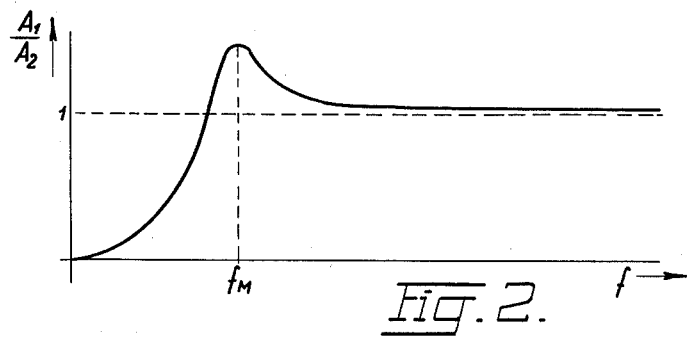
Fig. 2 shows a characteristic graph of such a system.

If the amplitudes of the body B are denoted by $A_2$ and the indicated amplitude of the instrument by $A_1$, that is, the relative vibrations between the body B and seismic mass M, as shown in the diagram of Fig. 1, the amplitude ratio $A_1/A_2$ gives the so-called swinging factor or the characteristic of the instrument. An example of the characteristic curve of a one-mass system according to Fig. 1 in relation to the changing frequency $f$ is shown in Fig. 2, wherefrom it can be seen that, if, for instance, the amplitude of the measured vibrations remains constant and only the frequency increases from zero value, the instrument shows a maximum of vibration amplitude when the frequency $f$ just equals the frequency of natural vibrations $f_M$ of the seismic mass M. All frequencies higher than this frequency $f_M$ will be fully included in the measurements, and, of these, it is just the above mentioned disturbing movements, for example, the self-excited oscillations, that distort the measurements of the instrument.

Figure 3:
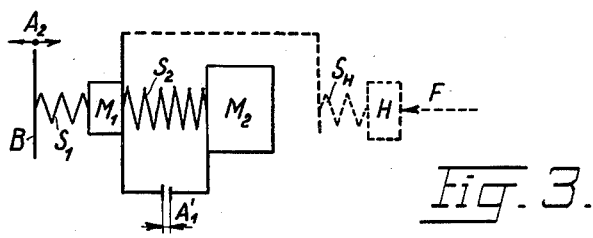
Fig. 3 shows, in diagrammatic form, the principle of the "two-mass" system which is the main improvement by the present invention.

(c) The dynamic principle of the "two-mass" system according to the present invention is illustrated in the functional diagram of Fig. 3. In this system, there are two yieldingly arranged masses, both of which are free to swing with amplitudes independent of each other and of the body the vibrations of which are to be studied. Referring to Fig. 3, the body including the necessary feeler is denoted by B and vibrates with an amplitude $A_2$. To this body the first mass $M_1$ is yieldingly attached, as shown by a spring $S_1$. The other or seismic mass $M_2$, usually bigger than the mass $M_1$, is yieldingly attached to the mass $M_1$, for example, by means of the spring $S_2$. The amplitude $A_1'$ of relative displacements of the two masses $M_1$ and $M_2$ is indicated in the instrument by an arrangement that will be described later.

Figure 4:
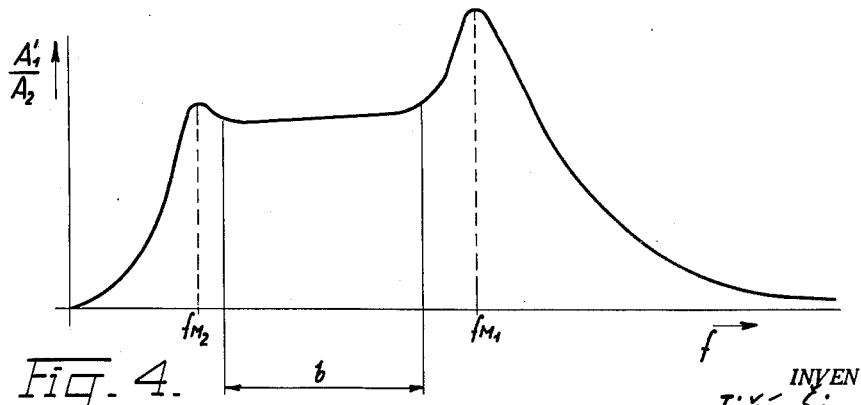
Fig. 4 shows a characteristic graph of the "two-mass" instrument.

The sizes of the masses $M_1$ and $M_2$ and the stiffnesses of the springs $S_1$ and $S_2$ are chosen so that the frequency of natural vibrations $f_{M1}$ of the mass $M_1$ is relatively high and the frequency $f_{M2}$ of the mass $M_2$ relatively low. Thus, referring to Fig. 4 showing the characteristic curve of such a system, the disturbing oscillations of higher frequencies are also filtrated out and the instrument will reliably indicate vibrations, the frequency of which lies in the range $b$ between the frequencies of natural vibrations $f_{M1}$ and $f_{M2}$ of the two masses $M_1$ and $M_2$.

Attention is drawn also to the elements H and $S_H$ that are shown in dotted lines in the diagram of Fig. 3. These are analogous to the handle with spring referred to in connection with Fig. 1 and have no influence on the dynamic system of the instrument. Their object is to ease the handling of the vibration meter, especially when held by hand while measuring, by preventing the greater part of the accelerating forces reaching the hands of the operator.

The vibration meter according to the invention will be described with reference to Figs. 5, 6 and 7, and includes a frame 1 cast in the form of a substantially rectangular box and having flanges 2 for attachment to a permanently fixed body, for example, by bolts or the like. By means of a removable lid 3 the interior of the frame 1 can be opened for inspection or adjustment purposes. A base plate 4 is fixedly attached to the bottom inner surface of the frame 1 with the help of screws 5. A transmitting rod assembly 6, 7 and 8 is suspended from the base plate 4 by means of two flat springs 9 and 10 fixed to the base plate 4 by screws 11.

The transmitting rod assembly consists of a transmitting rod 6, a body 7 fixed on the rod 6 and having protrusions 12, and a bracket 8 which is bolted to the body 7 and rigidly clamps the flat spring 10. The other flat spring 9 is secured to the transmitting rod 6 by a sliding carrier 13, the position of which can be adjusted along the rod.

A seismic mass 14 having a cylindrical bore 15 for receiving the transmitting rod 6 is yieldably attached to the rod 6, this attachment being achieved by a long flat spring 16 bent twice over an aligning piece 17 on the seismic mass 14 to present two generally parallel, resilient legs. To obtain a clearer impression of this arrangement reference may be had to the horizontal section shown in Fig. 6. The ends of the spring 16 are held in the carrier 13 and in another similar carrier 18 which is also adjustably fixed on the rod 6. Two members 19 slidable in the vertical direction along the corners of the mass 14 are connected by bolts 20 and can be secured at any convenient height on the mass 14 by tightening of the bolts 20. When the bolts 20 are tightened by turning their respective nuts 21, the washers 22 provided on the bolts clamp the flat spring 16 against the members 19.

Thus the effective lengths of the generally parallel legs of spring 16 can be changed according to requirements to effect tuning of the natural frequency of the seismic mass 14 in relation to the transmitting rod 6. In the actual instrument the effective lengths of the legs of spring 16 can be shortened to about one-half their original length.

The movement to be studied is applied to the transmitting rod 6 by means of a feeler 23 and by way of an adjustable U-shaped spring 24. The elasticity of the spring 24 can be changed within wide limits by adjusting movement thereof in the direction transverse to the axis of rod 6.

When the spring 24 is moved upwardly, as viewed in Fig. 5, the feeler 23 and rod 6 are connected by the bight portion of the U-shaped spring 24, so that the latter then provides a substantially rigid coupling. As the spring 24 is adjusted downwardly, the points of connection of the spring 24 to the feeler 23 and rod 6, respectively, move closer to the ends of the legs of the U-shaped spring 24 so that the resilience interposed by the latter between the feeler and the transmitting rod is increased.

When the resilience of the spring 24 is removed from the system, either by adjustment of the spring 24, so that the latter provides a rigid coupling between feeler 23 and rod 6, or by removal of the feeler 23 and spring 24, so that the rod 6 is then directly used as a feeler, the instrument is converted into an absolute or one-mass system.

In all other cases, that is, whenever the spring 24 provides a more or less resilient coupling between the feeler 23 and rod 6, the instrument embodies two masses 6, 7, 8 and 14, which are indicated in the diagram of Fig. 3 by the letters $M_1$ and $M_2$, and are able to swing or reciprocate relative to each other with independent amplitudes, the relative movement of the two masses being confined to one direction. The U-shaped spring 24 corresponds to the spring $S_1$ of Fig. 3. The springs 9 and 10 do not have any function other than to allow only the substantially linear movement of the mass $M_1$, that is, the assembly 6, 7 and 8 in relation to the frame 1. A coil spring 25 performs the function of the spring $S_H$ of Fig. 3, and abuts against a vertical bracket 26 provided on the frame 1 and holds the feeler 23 forcibly in contact with the object 27 under measurement which is oscillating in the direction shown by the arrows $A_2$. The bracket 26 further carries means to limit the movement of the transmitting rod 6 in the direction away from the object 27, for example, in the form of a screw 28 and a locking nut 29. On the feeler side of the transmitting rod 6 a stop 30 is provided to engage the frame 1 so as to limit the movement of the rod 6 in the direction toward the object 27.

In order to dampen the relative vibrations of the rod 6 and the seismic mass 14 a special liquid film damper is provided. This damper includes a sleeve 31 fixed to the bracket 8 of the transmitting rod assembly and a piston 32 axially movable with sufficient clearance in the sleeve 31 and attached by means of a joining rod 33 to a boss 34 on the seismic mass 14. The clearance between the piston 32 and sleeve 31 is filled with a viscous fluid held in place by adhesion. This type of damper operates properly in any position of the instrument, either horizontal or vertical, without any dry friction. Of course, as an evident alternative the sliding piston can be arranged in a cylinder within the mass 14, and the rod 33 then joins it to any convenient part of the transmitting rod assembly.

The relative movement of the transmitting rod assembly and of the seismic mass 14 is transmitted to a mirror 35 which deflects rays from a constant source onto a translucent screen 37.

For this purpose, the body 7 of the transmitting rod assembly is provided with a knife edge 38, and a rocking block 40 carrying the mirror 35 is provided with a lower groove 41 seating on the edge 38. The upper side of the rocking block 40 is engaged by one of three connecting rods 42 pivoted on the seismic mass 14. The connecting rods 42, which are swingable around a pivot 43, are pressed into contact with the rocking block 40 by means of three related flat springs 44. The connecting rods 42 have downward pointed ends 45 engageable in related upper recesses of the rocking block 40 which has a set of three recessed steps 46 at different levels. This arrangement is advantageous in order to obtain three different transmitting ratios of the swinging movement of the rocking block 40. When in operation, only one of the connecting rods 42 is of course engaged at its respective recess, while the other two rods 42 are kept disengaged through the action of related cams 47. The three cams 47 associated with the rods 42 are secured on a single camshaft 48, and, by turning the latter, the respective connecting rods are moved successively into engagement with the respective recessed steps of the rocking block 40. The purpose of making the edge 38 engage in a recessed groove 41 is to achieve a certain amount of self-adjustment by sliding of the rocking block 40 in either direction if the pointed end 45 of the operative rod 42 should not fit exactly into the corresponding recess of the block 40 because of incorrect alignment or distancing.

It should also be noted that the cams 47 are arranged to overlap each other so as to ensure a perpetual engagement of the rocking block 40 with at least one of the connecting rods 42. Before the pointed end 45 of one of the rods 42 is lifted off its seat, the pointed end of the following rod 42 is already in engagement, otherwise the whole set of elements could get disconnected and out of order.

The optical system of the instrument is enclosed in a casing 52 which flares upwardly from the rectangular frame 1 to which it is fixedly attached by screws 53. The casing 52 has its upper part closed by a cover 54 on which the light source 36 is mounted. The light source 36 comprises a tube 55, an incandescent bulb 56, a slit diaphragm 57 and a condensing lens 58. A window 59 is formed in the cover 54 and the translucent screen 37 extends across the window 59. Light rays from the source 36 are reflected upwardly by the mirror 35 against a mirror 60 carried by the cover 54, then downwardly against a mirror 61 carried by the top of frame 1 which reflects the light rays upwardly. The light rays from the source of light 36 pass through an objective lens 62 prior to striking the oscillating mirror 35, and the light rays pass through the same objective lens 62 prior to reflection by the mirror 60. From the mirror 61 the light rays are directed to the translucent screen 37, where a light band, its size corresponding to the magnitude of measured vibrations, is formed and whereon the measurement of the oscillation is carried out. The path of light rays in this instance is shown in full thin lines 63 on Fig. 7.

Before starting the measurement it may be necessary to adjust the mirror 35 into its central position, that is, into the horizontal plane as shown in the drawing in Fig. 5. This can best be achieved by tightening or loosening an adjusting spring 69 which is fixed, at one end, to the boss 34 of the seismic mass 14 and at its other end, to an adjusting spindle 70 extending through the two protrusions 12 of the transmitting body 7. By turning the spindle 70 the tension of the spring 69 can be changed and the mass 14 moved to its correct position, thereby tilting the rocking block 40.

When measuring vibrations with the instrument in a horizontal position, the seismic mass 14 functions as a mathematical pendulum, and the spring 69 should be rendered inoperative so that only the elasticity of the free lengths of the flat spring 16 influence the movement of the seismic mass 14. If measurement with the instrument in a vertical position is necessary, the spring 69 has to be tightened up by the spindle 70 so as to take up the weight of the seismic mass 14. It is to be noted that the spring 69 influences the natural frequency of the seismic mass in that case, and provision has to be made by careful calculation to ensure that the natural frequency of the seismic mass should remain practically the same in both cases. Therefore, measurements can be made reliably in any position and identical characteristic curves according to Fig. 4 used for all positions of the instrument.

When the instrument is not in use or is being carried, or in order to convert its system into that of a relative instrument, means are provided to lock or fix the seismic mass 14 to the base plate 4 of the frame 1 and include a flat spring 71 attached to the seismic mass 14 and, when in operation as a two-mass system or a seismic one-mass system, the spring 71 is free to move with the mass 14. A locking screw 72 acts on a flexible flat spring 73 and can be adjusted so that the latter presses the spring 71 onto the base plate 4, so that the mass 14 is rigidly locked with the frame 1.

Figure 7:
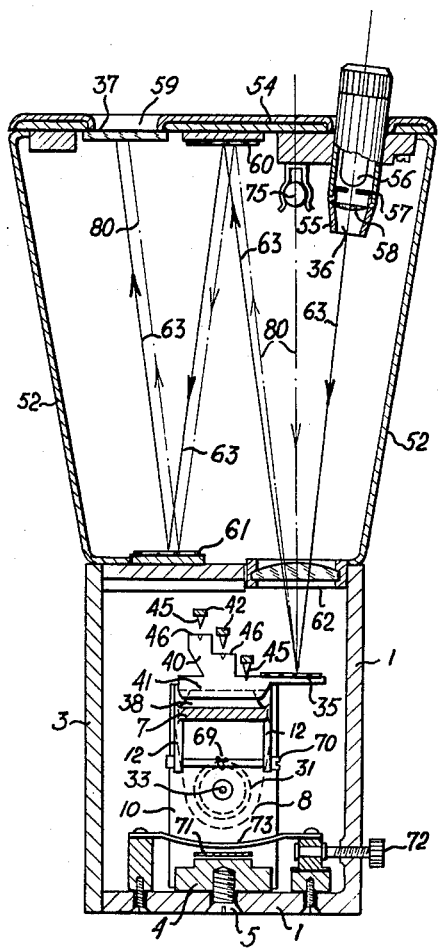
Fig. 7 is a sectional view taken along the line II—II of Fig. 5.

This arrangement can clearly be seen in Figs. 6 and 7. The locking or fixing of the seismic mass 14 relative to the frame 1 can be attained in various other ways, for example, by a lever by means of which the spring 71 is made to contact the base plate 4.

For examining vibrations having low frequencies an alternative feeler 74 is provided, the latter being fixed directly to the frame 1. In Figs. 5 and 6 the feeler 74 is shown as a plain rod which is suitable for the use of the instrument as a one-mass system. If a two-mass system is required, it can obviously be obtained by adding to the feeler 74 the parts 23 and 24, as shown in Fig. 5 on the rod 6. When using this arrangement of the two-mass system, the mass $M_1$, in the functional diagram of Fig. 3, is represented by the whole frame 1 including all elements fixed rigidly to it and is much larger than the mass $M_2$. In this alternative of the instrument the natural frequency $f_{M1}$ is lowered accordingly (Fig. 4), the range $b$ is narrowed and the instrument is able to filter out vibrations of lower frequencies than in the previously mentioned arrangement.

For studying the phase of vibrations a flash illuminator 75 is provided on the upper cover 54, and comprises an ordinary glow-light or fluorescent tube energized by current from a contactor unit which will be hereinafter described in detail. The terminals through which the current enters the light source 36 and the flash illuminator 75 are enclosed in a socket 76 and a switch 77 is provided on the cover 54, the function of which will also be explained later.

Figure 8:
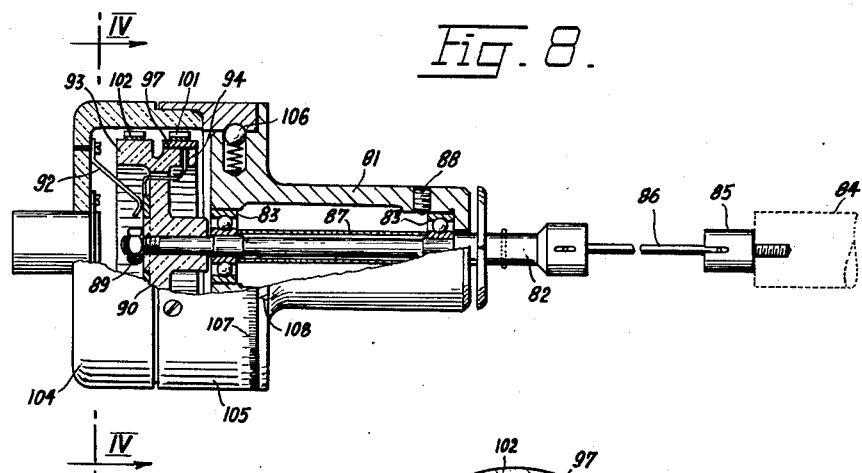
Fig. 8 is an elevational view, partly in section, of a contactor used in conjunction with the instrument of Figs. 5, 6 and 7.
Figure 9:
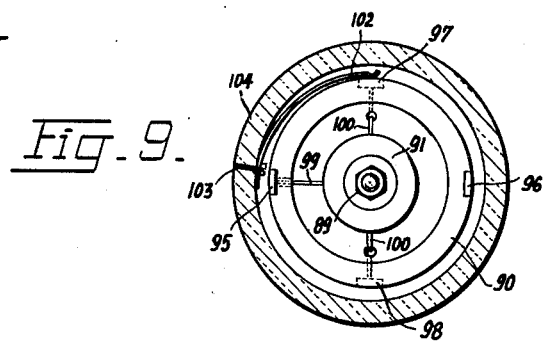
Fig. 9 is a sectional view of the contactor taken along the line IV—IV of Fig. 8.

The contactor or interrupter unit, that is, the means to obtain a sequence of electric pulses for feeding the glow tube 75 in relation to a cyclic phenomenon, for example, in relation to the rotation of a rotor to be balanced, is shown in Figs. 8 and 9.

The contactor comprises a body 81 that can be held by the operator during the measurement or can be fixed on an appropriate stand or bracket (not shown). A shaft 82 is rotatable in bearings 83 in body 81 and its movement is coupled, for example, with that of the rotor 84 which is to be balanced. This coupling is effected, in the device of Fig. 8, by a transferring member 85 and a drive 86 of a relatively greater length. Of course, the coupling can be arranged in a different manner. The two bearings 83 are held apart by a spacing tube 87, while one of the bearings is fixed in position by a screw 88. A rotor 90 made of an electrically insulating material is fixed to the end of the shaft 82 by means of a nut 89. The rotor 90 has an electrically conducting collecting ring 91 rigidly attached to it, and electric current is fed to the ring 91 by means of one or more brushes 92. The rotor 90 is provided with two parallel circumferential rims 93 and 94, which form the body for contacts 95, 96, 97, and 98. There are two contacts on each rim at 180° to each other, while the contacts on one rim are offset by 90° with regard to the contacts on the other rim. One contact 95 on the rim 93 is electrically connected to the ring 91 by means of a wire 99, while the other contact 96 on the same rim is disconnected and reserved for alternative purposes. An important object of the contact 96 is to balance the other contact 95. The contacts 97 and 98 are both electrically connected to the collecting ring 91 by wires 100. There are two collecting springs or brushes 101 and 102, the collector 101 being associated with the rim 94 with the two contacts 97 and 98, and the collector 102 being associated with the rim 93 with the single operative contact 95. The collectors 101 and 102 are fixed, by means of screws 103, to a casing 104 of electrically insulating material which forms an integral part with the other half of the casing 105. The casing 104 and 105 is turnable relative to the body 81 on spring loaded balls 106; and a graduated scale 107 is provided on the part 105 and cooperates with a pointer 108 on the body 81 so that the phase position can be read.

Figure 10:
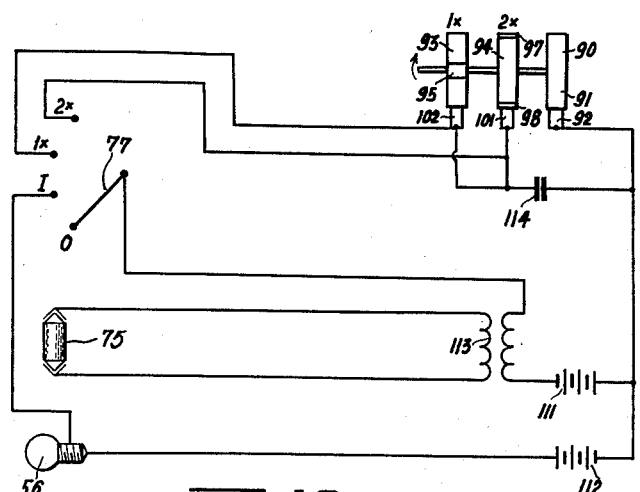
Fig. 10 is a wiring diagram for the entire apparatus showing the electrical connections of the several elements thereof.

An example of the electrical wiring system is shown in Fig. 10, wherein the above mentioned elements are identified by the same numerals as used above.

The electric circuit is fed by low voltage batteries 111 and 112. Only the battery 111 is needed to produce the flashes of the glow lamp 75, and the changing to high voltage (about 200v.) is accomplished by a transformer 113, when the switch 77 is in one or the other of its positions 1x or 2x.

With the switch 77 in the position 2x, the electric current flows through the brush 92 into the collecting ring 91 of the rotor 90 and further, at the moments of engagement of the contacts 97 and 98 with the collector 101, into the switch 77, transformer 113 and back to the battery 111. In this case, two flashes of the glow lamp 75 will occur, during each revolution of the rotor 84.

With the switch 77 in the position 1x, the electric current flows similarly, but with the difference that it passes through the contact 95 of the rim 93 of the rotor 90, thereby giving only one flash during each revolution. In order to produce instantaneous flashes, a condenser 114 is wired in parallel to the contacts.

When the switch 77 is in the position I, the incandescent bulb 56 of the light source 36 is continuously illuminated, being fed by electric current from both batteries 111 and 112. The off position of the switch 77 is indicated at 0 in Fig. 10.

The operation of the above described apparatus is as follows:

To make measurements with the instrument as a relative system, it is necessary to fix the frame 1 of the vibrator unit to the vibrating body in the direction in which the vibrations or displacements are to be measured. To take up the movement of the studied body the rod 6 is used as a feeler, with the elements 23 and 24 being removed. By means of the locking screw 72 the seismic mass 14 is fixed to the frame 1. The switch 77 is in the position I, ensuring constant illumination of the incandescent bulb 56. When measuring vibrations, the length of the light band formed on the screen 37 indicates, in a predetermined ratio, given by the instrument coefficient, the size of the amplitudes.

While using the instrument as an absolute or one-mass or seismic system, that is, for measuring vibrations of a frequency about 10 cycles per second or more, the vibrator unit can be held in the hands of the operator and feeler 74 is used to transmit the vibrations, or alternatively the frame 1 can be directly fixed to the object the vibrations of which are to be measured. In this manner vibrations of bigger machines can be studied. If vibrations of small electric motors and the like are to be measured, it is advantageous to use the rod 6 as the feeler in order not to influence the movement of the vibrating object by adding to it the considerable mass of the frame 1, casing 52 and the like. After loosening the seismic mass 14, by means of the screw 72, the switch 77 is again in position I. The necessary enlargement ratio of the mechanical system is then seleceted by turning the camshaft 48 to its appropriate position. Then the central position of the light trace on the screen 37 can be adjusted by turning the spindle 70. For measurements of vertical vibrations, it is necessary to adjust the central position of the oscillating mirror 35 by increasing the tension of the spring 69.

When the spring 24 is attached to either the rod 6 or the feeler 74, the instrument functionally becomes a two-mass system, by which disturbing movements superimposed on the movement produced by the out-of-balance forces are filtered out. The disturbing movements of high frequencies, which show themselves on the screen 37 as narrow strips, can be removed by a suitable adjustment of the elastic length of the spring 24. The disturbing movements of low frequencies producing displacement of the marginal portions of the light trace on the screen 37 can be eliminated from the measurement by shortening the effective lengths of the suspension spring 16. The frequency corresponding to the revolutions of the rotor to be balanced must lie between both natural frequencies of the indicating system. If vibrations having low frequencies are to be measured, the spring 24 is arranged on the rod 74, and if vibrations having high frequencies are studied, the spring 24 is arranged on the rod 6, as shown in Fig. 5.

For balancing rotors at constant revolutions the vibration meter is used with the rotational contactor of Figs. 8 and 9. By this expedient a very high accuracy is attained in measuring the vibration phase. The member 85 is connected coaxially to the rotor 84 to be balanced, and the contactor body 81 is fixed, for example, in an appropriate stand. When the rotor 84 rotates at a constant speed, the amplitude of vibrations is measured. After that the switch 77 is changed to the position 2x. In this position, the glow lamp 75 supplies two flashes during each revolution, and images of these flashes are projected on the screen 37 by way of the mirror 35 and the fixed mirrors 60 and 61, as indicated by the dot dash line 80 on Fig. 7. As there are two flashes during each revolution, the observer sees two strips, that are moved relative to each other if the casing 104 and 105 is turned. In an appropriate position of the casing 104 and 105 the coincidence of the two strips can be obtained. In this angular position of the casing 105, the angle is read on the scale 107 with the help of the index or pointer 108. Obviously, the feeler is held in contact with the vibrating object. After ascertaining the angle which indicates the angle of the vibration phase, the switch 77 is moved into the position 1x, so that only one flash per revolution occurs. Then the casing 104 and 105 is rotated in any direction approximately through an angle of 90° one strip moving in a certain direction is observed on the screen 37. If the strip moves from the front to the rear, the indicated angle is the required vibration phase. If it moves from the rear to the front, 180° are to be added or subtracted from the indicated angle in order to obtain the required vibration phase.

Although an illustrative embodiment of the invention has been described in detail herein with reference to the accompanying drawings, it is to be understood that the invention is not limited to that embodiment, and that various changes and modifications may be effected therein without departing from the scope or spirit of the invention, except as defined in the appended claims.

I claim:

1. A vibration indicator comprising two masses individually movable along parallel paths, first adjustably resilient connecting means between said two masses, feeler means for making contact with a body the vibrations of which are to be studied, second adjustably resilient connecting means between said feeler means and one of said masses, said resilient connecting means being adjusted and the magnitudes of said masses being selected to provide said masses with natural frequencies of oscillation along said parallel paths which are respectively lower and higher than the frequency of the vibrations to be studied, a rockable mirror, means responding to relative movements of said two masses along said paths to cause corresponding rocking of said mirror, and optical means indicating the magnitude of the rocking of said mirror.

2. A vibration indicator as in claim 1; further comprising means for locking the other of said masses against movement in the direction of the related path, thereby to convert the indicator to a relative system.

3. A vibration indicator as in claim 1; wherein said mirror is rockably mounted on one of said masses, and said optical means indicating the rocking of the mirror includes means emitting light directed against said mirror, and means for receiving light reflected from said mirror and upon which the path of the reflected light may be viewed.

4. A vibration indicator as in claim 3; wherein said means for rocking the mirror includes transmission means carried by the other of said masses and selectively engageable with said rockable mounting means of the mirror at varying distances from the rocking axis of the latter, thereby to vary the ratio of the rocking of said mirror to the relative movements of said masses.

5. A vibration indicator as in claim 4; wherein said means rockably mounting said mirror on said one mass includes a rockable block having steps disposed at different distances from the rocking axis thereof; and said transmission means includes a series of connecting rods pivotally mounted on said other mass for movement into and out of driving engagement with related steps of said rockable block, and manipulatable cam means controlling said connecting rods to selectively engage the latter with said related steps.

6. A vibration indicator as in claim 5; wherein said one mass has a knife edge extending therefrom and said block has an elongated recess receiving said knife edge to define the rocking axis of the block so that the latter can shift slightly along said axis to ensure proper engagement of said connecting rods with said related steps of the block.

7. A vibration indicator as in claim 1; further comprising damper means connected between said two masses and including a cylinder, a piston reciprocable in the cylinder with a clearance therebetween and a liquid film adhering to the cylinder in said clearance so that only fluid friction is opposed to the relative movements of said cylinder and piston with said masses in any position of said indicator.

8. A vibration indicator as in claim 1; wherein said one mass includes an elongated rod having its axis extending parallel to said paths, and the other of said masses includes a seismic mass having a bore therein through which said rod loosely extends, said first adjustably resilient connecting means including a generally U-shaped spring having substantially parallel legs secured, at their ends, to said rod, and means for varying the elasticity of said U-shaped spring serving as a connection between said rod and said seismic mass.

9. A vibration indicator as in claim 8, wherein said feeler means extends co-axially with said rod, and said second adjustably resilient connecting means includes a generally U-shaped spring having substantially parallel legs extending perpendicular to said axis of the rod and connected to the latter and to said feeler means, respectively, said spring of the second connecting means being movable in the direction of the legs thereof, thereby to vary the effective lengths of said legs and, consequently, the resilience of said second connecting means.

10. A vibration indicator as in claim 8; further comprising a frame, means mounting said one mass and rod for movement relative to said frame, a leaf spring extending from said seismic mass generally in said direction of movement, a bowed spring carried by said frame and extending laterally across said leaf spring, and means for varying the bowing of said bowed spring to cause the latter to press said leaf spring against said frame, thereby to frictionally lock said seismic mass against movement relative to said frame.

11. A vibration indicator as in claim 1; wherein said optical means indicating the rocking of said mirror includes intermittently operative means for directing light against said mirror in synchronism with a cyclic phenomenon having a particular phase relationship to the vibrations beings studied, and means for viewing the light reflected from said mirror.

12. A vibration indicator as in claim 11; wherein said intermittently operative means for directing light against said mirror comprises a flashing light source, an electric circuit for intermittently energizing said light source, a contactor including a rotor rotatable in synchronism with said cyclic phenomenon and having first and second contacts spaced angularly apart by 180 degrees and a third contact spaced axially from said first and second contacts and angularly displaced from the latter by 90 degrees, and a turnable casing carrying brushes disposed for engagement with said first and second contacts and said third contact, respectively, and switching means in said circuit for selectively interposing in the latter said brushes associated with said first and second and said third contacts, respectively, so that, with said first and second contacts and the related brush interposed in said circuit, said light source flashes twice during each revolution of said rotor and said casing can be turned to merge the viewed images of both flashes at the central position of the movement of the reflected light, thereby to determine the time relation between the vibration and the cyclic phenomenon and, thereafter, with said third contact and the related brush interposed in said circuit, said casing can again be turned to determine the position of the phase angle of the vibration in relation to the cyclic phenomenon.

References Cited in the file of this patent

UNITED STATES PATENTS

| | | |
|---|---|---|
| 1,625,625 | Ricker | Apr. 19, 1927 |
| 1,727,991 | Kimball et al. | Sept. 10, 1929 |
| 1,797,235 | Kasley | Mar. 24, 1931 |
| 1,949,603 | Davey | Mar. 6, 1934 |
| 2,004,270 | Davey | June 11, 1935 |
| 2,622,436 | Carr | Dec. 23, 1952 |
| 2,754,435 | Ongaro | July 10, 1956 |

OTHER REFERENCES

Pages 83–87 and 94, March, 1942, issue of Instruments—New Method of Measuring Mechanical Vibrations by H. C. Werner.